Oct. 1, 1935. A. D. HANRATTY 2,015,717

COMBINATION FUEL AND BRAKE CONTROL MEANS

Filed June 25, 1934

INVENTOR,
Arthur D. Hanratty
BY J. E. Trabucco
ATTORNEY

Patented Oct. 1, 1935

2,015,717

UNITED STATES PATENT OFFICE 2,015,717

COMBINATION FUEL AND BRAKE CONTROL MEANS

Arthur D. Hanratty, San Francisco, Calif.

Application June 25, 1934, Serial No. 732,229

5 Claims. (Cl. 192—3)

This invention relates to improvements in combination brake and accelerator control means for automobiles.

An object of my invention is to provide novel and improved means operable from the brake pedal of an automotive vehicle for controlling the flow of fuel to the vehicle's motor.

Another object of my invention is to provide a novel combination brake and accelerator control means for automotive vehicles which operates to automatically discontinue the flow of fuel to the vehicle's engine when the brake is applied to stop or retard the vehicle.

A further object of my invention is to provide an improved control means of the type characterized which not only affords a less expensive construction than the individual and independently operated foot accelerator and foot brake now commonly used on automobiles, but one which operates with greater convenience and satisfaction.

Other objects and advantages will be pointed out or will present themselves in the description of my invention which is to follow.

Figure 2:
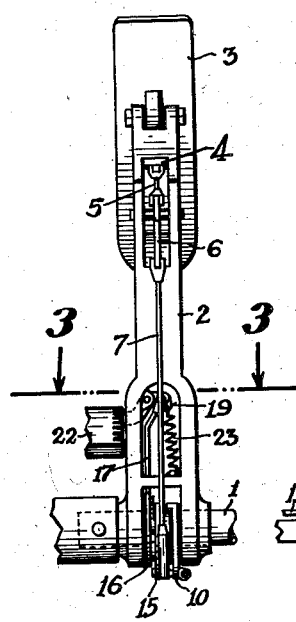
Fig. 2 is a rear view of the same.
Figure 1:
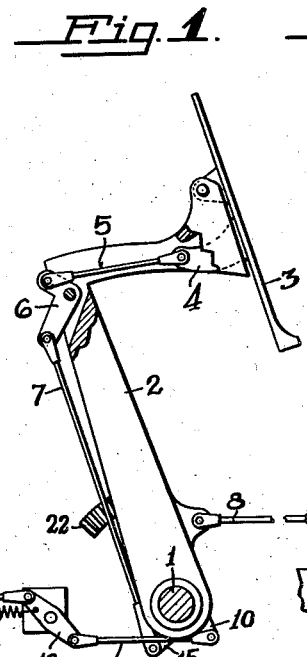
Fig. 1 is a side view of a combined accelerator and brake control embodying my invention, showing parts broken away and in section.
Figure 5:
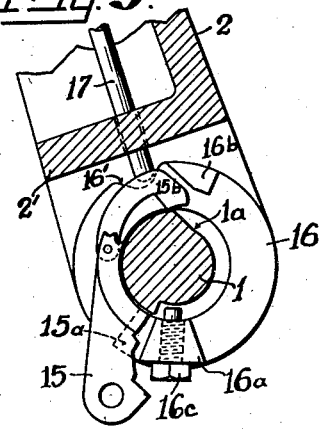
Fig. 5 is a section taken on the line 5—5 of Fig. 4.
Figure 3:
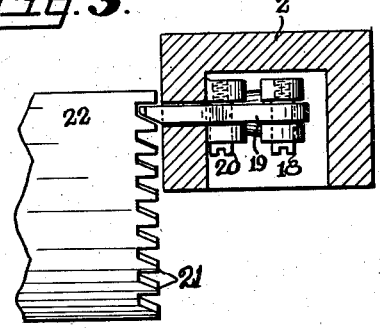
Fig. 3 is a section taken on the line 3—3 of Fig. 2.
Figure 4:
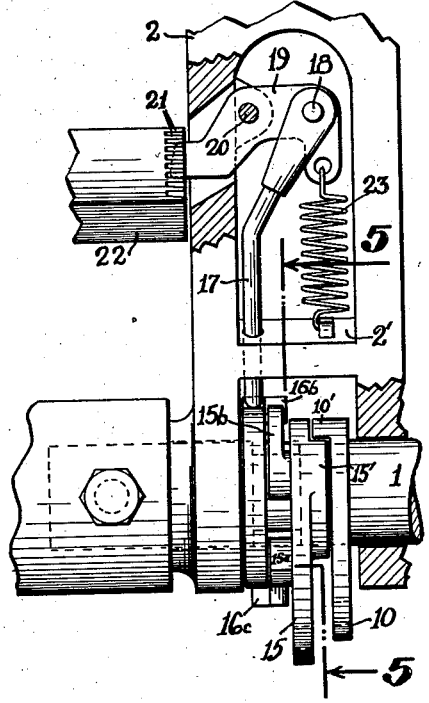
Fig. 4 is an enlarged rear view, partly in section, of that part of the apparatus which is located beneath the dotted section 3—3 line of Fig. 2.
Figures 6, 7:
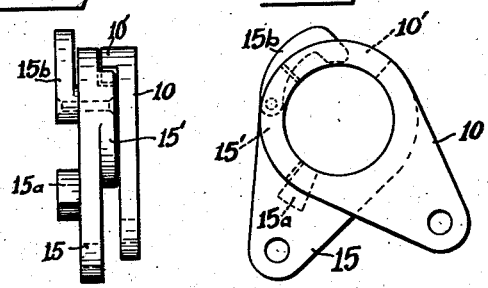
Fig. 6 is a rear view of two cooperating members which are a part of the means employed to control the flow of fuel to the vehicle's motor.
Fig. 7 is a side view of the two cooperating members illustrated in Fig. 6.

Referring to the drawing the numeral 1 indicates a stationary supporting shaft having the forked end of a brake operating pedal 2 rotatably mounted thereon. The upper end of the pedal is provided with a pivoted foot member 3 having a forwardly disposed flange 4 thereon to which is movably secured a rod 5. The rod 5 is also movably attached to one end of a bell crank 6 which is pivotally mounted on the pedal 2, the opposite end of the said bell crank being pivotally connected to a depending rod 7. The pedal 2 is attached to a rearwardly disposed brake operating rod 8 which is ordinarily pulled forwardly to apply the brake by the movement in a forward direction of the said pedal. A spiral spring 9 serves to automatically return the rod 8 and the pedal 2 to a position in which the brake is again released.

Rotatably mounted on the shaft 1 between the forked ends of the pedal 2 is a disc 10 having a forwardly disposed rod 11 pivotally attached to its depending end, the said rod being connected to an end of a centrally pivoted lever 12 which is connected at its opposite end to a rod 13 that is operatively connected in the usual manner to the throttle mechanism for regulating the flow of fuel to the motor of the vehicle. When the disc 10 is gradually rotated in a direction whereby its depending end is moved in a forward direction, the rods and lever are also actuated so as to cause the fuel to flow in increasing quantities to the motor of the vehicle. When the pressure is removed from the disc 10 a spiral spring 14 serves to automatically move the lever 12, the rods 11 and 13 and the said disc in a reverse direction thereby decreasing the flow of fuel to the motor. Also rotatably mounted on the shaft 1 adjacent the inner side of the disc 10 is a lever member 15 having the downwardly disposed end of the rod 7 pivotally connected to its depending end. The adjacent sides of the disc 10 and the lever member 15 are provided with projecting parts 10' and 15' respectively. When the foot piece 3 is moved about its pivot by pressing its upper end in a forward direction, the lower end thereof is actuated in a rearward direction, thereby causing the bell crank 6 to be turned so as to bring about the rotation of the lever member 15 in a clockwise direction. As the lever member 15 is thus turned in a clockwise direction the projecting part 15' thereof engages with the projecting part 10' of disc 10. After the engagement of the two projecting parts, the continued rotation of the lever member 15 causes the turning of the disc 10 in a clockwise direction, thereby moving the latter's depending end forwardly so as to cause the fuel control mechanism to gradually allow an increasingly greater supply of fuel to flow to the motor. When the inward pressure on the top end of the foot piece 3 is removed, the return movement of the disc 10, occasioned by the tension of the spring 14, automatically rotates the lever member 15 in a reverse direction, thereby causing the return of the said foot piece to a position in which the top end is no longer pressed forwardly.

Rotatably mounted on the shaft 1 between the forked ends of the pedal 2 and adjacent the opposite side of the lever member 15 is a wheel 16 having a groove 16' on the upper side of its periphery. Extending downwardly through an enlarged opening in a cross piece 2' which bridges the space between and is carried by the two forked ends of the pedal 2, is a movable bar 17. The lower end of the bar 17 is normally positioned in the groove 16', but when the wheel 16 is turned in either direction the said bar is elevated and its end rides out of the groove onto that part of the wheel's periphery located at a side of the said groove. The upper end of the bar 17 is movably attached as at 18 to an end of a pivoted stop member 19. The stop member is pivotally mounted, as at 20, on one of the forks of the pedal 2, and the opposite end of the said stop member normally extends through a slot in the said fork between two of a number of teeth 21 of a stationary arcuate shaped rack 22 secured to the frame of the vehicle. A spiral spring 23 secured at one of its ends to that end of the stop member to which the bar 17 is connected, and at its opposite end to the cross piece 2', serves to normally maintain the outwardly disposed end of the said stop member in engagement with the teeth of the rack 22. Only when the lower end of the bar 17 is positioned in the groove 16' of the wheel 16 is the stop member in engagement with the teeth of the rack; at other times when the wheel is positioned so the bar is moved upwardly and its lower end becomes positioned on the wheel's periphery, the stop member is moved about its pivot so as to cause the disengagement thereof from the teeth of the said rack. During the time the stop member 19 engages with the teeth of the rack 22 the pedal 2 is normally prevented from being moved either backwardly or forwardly, but when the wheel 16 is moved so as to cause the lower end of the bar 17 to be raised out of the groove 16' the stop member is moved to a position free of the rack 22, thereby permitting the said pedal to be moved backwardly and forwardly. The teeth 21 of the rack 22 are gradually inclined at their rear sides, thereby permitting the stop member 19 to be freed therefrom should the pedal 2 be pressed in a forward direction with more than the usual force. So as to permit the driver of the vehicle to apply the brakes without the necessity of operating the device in the normal hereinafter described manner, the teeth 21 are constructed as above described. The position of the pedal may be adjustably changed by causing the stop member to engage with different teeth of the rack.

Secured to that side of the lever member 15 which is located adjacent the inner side of the wheel 16 is a lug 15a which is carried into engagement with the lug 16a on the wheel when the said member is turned in a counter-clockwise direction. The lever member is moved in a counter-clockwise direction by pressing the lower end of the foot piece 3 in a forward direction. When the foot piece is so actuated the rod 5 is bodily moved in a forward direction thereby causing the bell crank 6 to be turned so as to depress the rod 7 and move the lever member in a counter-clockwise direction. The continued movement of the lever member in a counter-clockwise direction after the lugs 15a and 16a are in engagement rotates the wheel 16 in the same direction, thereby carrying the groove 16' to a position in front of and beyond the end of bar 17. The consequent raising of the bar by reason of its lower end riding up the side of the groove to the periphery of the wheel 16, causes the disengagement of the stop member 19 from the teeth of the rack 22. The pedal 2 may thereupon be moved in a forward direction to apply the brakes of the vehicle by the continued forward pressure against the lower end of the foot piece 3. If, after the pedal 2 has been moved forwardly and the brakes are applied, the driver desires to operate the accelerator in a manner which will cause the fuel to be fed to the motor in increasing quantities, he presses the upper end of the foot piece 3 forwardly while the pedal is held in a forwardly disposed position.

The inner side of the wheel 16, at a point near its periphery and approximately opposite the lug 16a, is provided with a protuberance 16b. The disc 15, at a point near its periphery and in front of the lug 16b, is provided with a pivoted pawl 15b. After the brake has been applied and the upper end of the foot piece 3 is pressed forwardly to increase the flow of fuel to the motor, the disc 15 is actuated in a clockwise direction, thereby carrying the pawl 15b into engagement with the protuberance 16b of the wheel 16. The continued movement of the disc in a clockwise direction with the pawl 15b in engagement with the protuberance 16b causes the said wheel to also rotate in a clockwise direction. The groove 16' is thereupon carried through and then forwardly of the end of the bar 17, thereby allowing the pedal 2 to be moved rearwardly if it is desired that the brake be released. After the wheel 16 has been moved in a clockwise direction to a position whereby the end of the bar 17 is positioned on its periphery in front of the groove 16', the accelerator may be manipulated to regulate the flow of fuel to the motor by the upper end of the foot piece 3 being moved back and forth while the pedal is held in a forwardly pressed position. The disc 15 is capable of being turned in clockwise and counter-clockwise directions while the pedal is held in a forwardly pressed position because the pawl 15b, after it has moved the wheel 16 to a certain position, drops into a cut out portion 1a on the periphery of the shaft 1 and is thereby freed of the protuberance 16b of the said wheel. The clockwise movement of the wheel 16 is stopped by the end of a screw 16c which extends through the lug 16a, coming into engagement with a shoulder provided on the shaft 1 at the lower end of the cut out portion 1a.

It is to be understood that my invention is susceptible of numerous changes with respect to form, shape and minor details of construction. It is, therefore, to be understood that the appended claims shall determine the limits my invention may assume rather than the exact disclosures herein made.

Having described my invention what I claim is:

1. Combination brake and fuel control comprising a pivoted brake control pedal having a brake operating means operatively connected thereto, a pivoted foot piece mounted on the pedal, a stationary shaft, a rotatable member mounted on the shaft and operatively connected to and adapted to be rotated by the pivotal movement of the foot piece, a second rotatable member mounted on the shaft and connected to fuel control means, and means interposed between the two rotatable members for causing the second rotatable member to be rotated by the first mentioned rotatable member.

2. Combination brake and fuel control comprising a pivoted brake control pedal having a brake operating means operatively connected thereto, a pivoted foot piece mounted on the pedal, a stationary shaft, a rotatable member mounted on the shaft and operatively connected to and adapted to be rotated by the pivotal movement of the foot piece, a second rotatable member mounted on the shaft and operatively connected to fuel control means, means interposed between the two rotatable members for causing the second rotatable member to be rotated in a certain direction by the first mentioned rotatable member when the latter is rotated in the same direction by the pivotal movement of the foot piece, and spring means for causing a rotation in a reverse direction of the rotatable members and the foot piece.

3. Combination brake and fuel control means comprising a pivoted foot pedal operatively connected to brake operating means, a foot piece pivotally mounted on the pedal, a rotatable member operatively connected to the foot piece and adapted to be rotated in opposite directions by the pivotal movement of the foot piece in opposite directions, fuel control means adapted to be actuated in a certain direction by the movement of the rotatable member in a certain direction, spring means for moving the fuel control means and the pivoted member in a reverse direction, locking means for holding the pedal in a certain position, and means interposed between the locking means and the rotatable member and operable when the rotatable member is rotated in a reverse direction by the foot piece, whereby the said pedal locking means may be released.

4. Brake control means comprising a pivoted foot pedal operatively connected to brake operating means, a foot piece pivotally mounted on the pedal, a rotatable member, means operatively connecting the foot piece and the rotatable member whereby the rotatable member may be rotated by the pivotal movement of the foot piece, locking means for releasably holding the pedal in a certain position, and means interposed between the rotatable member and the locking means for releasing the latter when the rotatable member is rotated by the foot piece in a certain direction.

5. Combination brake and fuel control means comprising a pivoted foot pedal having brake operating means operatively connected thereto, a foot piece movably mounted on the pedal, fuel control means, locking means for releasably maintaining the pedal in a certain position, a rotatable member capable of being rotated in opposite directions, motion transferring means connecting the rotatable member and the foot piece, whereby the rotatable member may be rotated in a certain direction by the movement of the foot piece in a certain direction and in the opposite direction by the movement of the foot piece in a different direction; means interposed between the rotatable member and the fuel control means for transferring motion to the fuel control means from the rotatable member when the latter is rotated in a certain direction by the foot piece, and means interposed between the rotatable member and the locking means for releasing the said locking means when the rotatable member is rotated in the opposite direction by the foot piece.

ARTHUR D. HANRATTY.